US007640353B2

United States Patent
Shen et al.

(10) Patent No.: US 7,640,353 B2
(45) Date of Patent: Dec. 29, 2009

(54) GUIDED RANDOM SEEK SUPPORT FOR MEDIA STREAMING

(75) Inventors: Guo Bin Shen, Beijing (CN); Shipeng Li, Beijing (CN); Changxi Zheng, Chongqing (CN)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 11/380,619

(22) Filed: Apr. 27, 2006

(65) Prior Publication Data

US 2007/0255844 A1 Nov. 1, 2007

(51) Int. Cl.
*G06F 15/16* (2006.01)
(52) U.S. Cl. .................................. 709/231; 709/230
(58) Field of Classification Search ................. 709/219, 709/230–231; 725/105, 116–119, 135
See application file for complete search history.

(56) References Cited

U.S. PATENT DOCUMENTS

| | | | |
|---|---|---|---|
| 5,220,667 A | | 6/1993 | Ichieda |
| 5,713,008 A | | 1/1998 | Falkner |
| 5,950,007 A | | 9/1999 | Nishiyama et al. |
| 6,073,215 A | * | 6/2000 | Snyder ........................ 711/137 |
| 6,073,232 A | | 6/2000 | Kroeker et al. |
| 2003/0097657 A1 | * | 5/2003 | Zhou et al. ..................... 725/46 |
| 2003/0204673 A1 | * | 10/2003 | Venkumahanti et al. ..... 711/137 |
| 2004/0010593 A1 | * | 1/2004 | Apostolopoulos et al. ... 709/226 |
| 2004/0010613 A1 | * | 1/2004 | Apostolopoulos et al. ... 709/231 |
| 2004/0268051 A1 | * | 12/2004 | Berg et al. ................... 711/137 |

OTHER PUBLICATIONS

Huang et al. "A User-Aware Prefetching Mechanism for Video Streaming." [Retreived Online on Apr. 1, 2009] Dec. 2003. [Retreived from the Internet] <URL: http://www.springerlink.com/content/q4154806732g4602/fulltext.pdf>.*
Jin et al. "Single Stream Image and Stream Network Prefetch in Streaming Media Proxy Caching." [Retreived Online on Apr. 1, 2009] Mar. 2005. [Retreived from the Internet] <URL: http://ieeexplore.ieee.org/stamp/stamp.jsp?tp=&arnumber=1423578>.*
Kim et al. "Clustered Multimedia NOD: Popularity-Based Article Prefetching and Placement." [Retreived Online on Apr. 1, 2009] Mar. 1999 [Retreived from the Internet] <URL: http://ieeexplore.ieee.org/stamp/stamp.jsp?arnumber=00830039>.*

(Continued)

*Primary Examiner*—Bunjob Jaroenchonwanit
*Assistant Examiner*—James T Baron
(74) *Attorney, Agent, or Firm*—Lee & Hayes, PLLC

(57) ABSTRACT

Seek support facilitates convenient access to portions of a media file a user wishes to access. Seek support is provided by a usage model based on prior users' access of a media file or expected user access patterns. The usage model reflects expected next segments a user will seek when accessing the media file. A prefetching model derived from the usage model reduces seeking delay by prefetching one or more expected next segments identified from the usage model that will result in minimal seeking distance. Correspondingly, a method of prefetching segments also facilitates access to the media file. A quantity of segments of a media file to be prefetched and a current region of a media file being access are identified. At least one next segment identified by the prefetching model as an expected next seeking destination from the current region is identified, and the next segment is prefetched.

15 Claims, 7 Drawing Sheets

OTHER PUBLICATIONS

Choi et al. "A Prefetching Scheme based on the Analysis of User Access Patterns in News-On-Demand System." [Retreived Online on Apr. 1, 2009] Dec. 2003 [Retreived from the Internet] <URL: http://delivery.acm.org/10.1145/320000/319482/p145-choi.pdf?key1=319482&key2=2755958321&coll=GUIDE&dl=GUIDE&CFID=28487489&CFTOKEN=27225043>.*

Zheng et al. "Distributed Prefetching Scheme for Random Seek Support in Peer-to-Peer Streaming Applications." {Retreived Online on Apr. 1, 2009] Nov. 11, 2005. [Retreived from the Internet] <URL: http://www.cs.cornell.edu/~cxzheng/publications/acmmm2005p2ms.pdf>.*

Harizopoulos et al. "Hierarchical Caching and Prefetching for Continous Media Servers with Smart Disks." [Retreived Online on Apr. 7, 2009] Published by the IEEE in 2000. [Retreived from the Internet] <URL: http://ieeexplore.ieee.org/stamp/stamp.jsp?arnumber=00865888>.*

Lloyd, Stuart P. "Least Squares Quatization in PCM." [Retreived online on Apr. 14, 2009] Published in 1982. [Retreived from the Internet] <URL: http://ieeexplore.ieee.org/stamp/stamp.jsp?arnumber=01056489>.*

English et al., "Loge: a self-organizing disk controller," Proceedings of USENIX Winter 1992 Technical Conference, Jan. 1992, pp. 237-251.

Hatfield et al, "Program restructuring for virtual memory", IBM Systems, No. 3, 1971, pp. 168-192.

Kroeger et al, "Predicting Future File-System Actions From Prior Events", Proceedings of the USENIX 1996 Annual Technical Conference, San Diego, California, Jan. 1996, 11 pages.

Palmer et al., "Fido: a Cache That Learns to Fetch", Proceedings of the 17th International Conference on Very Large Data Bases, Barcelona, Spain, Sep. 1991, pp. 255-264.

Patterson et al, "Informed Prefetching and Caching", Proceedings of the 15th ACM Symposium on Operating System Principles, Copper Mountain Resort, Colorado, Dec. 1995, pp. 79-95.

Staelin et al, "Smart Filesystems", USENIX, Winter 1991, Dallas, Texas, pp. 45-51.

Tait et al, "Detection and Exploitation of File Working Sets", Computer Science Department, Columbia University, New York, New York, 1991 IEEE, pp. 2-9.

Griffioen et al, "Reducing File System Latency using a Predictive Approach", Department of Computer Science, Univeristy of Kentucky, 1994, 11 pages.

* cited by examiner

GUIDED RANDOM SEEK SUPPORT FOR MEDIA STREAMING

BACKGROUND

With widespread availability of broadband communications and the convergence of personal entertainment systems and personal computers, multimedia streaming is becoming increasingly more popular. Using a client computer, a user requests a multimedia stream, which may include an audio file, an audiovisual file, or other type of media file. Upon receiving the client request, a system acting as a server streams the media file to the client. In turn, the client receives and stores the stream, allowing the user to access the content. The user can begin to access the content as soon as some portion of the multimedia stream has been stored; the client computer need not receive the entire media file before presenting it is to the user.

Ideally, streaming media provides the content of the media file to the user smoothly and without interruption. However, if the streaming of the media file does not keep pace with or remain ahead of the playback of the content, presentation of the content will become choppy: each time that the playback catches up with the point in the media file that has been received, playback will stop while waiting for additional portions of the media file to be received by the client computer.

Client computers typically cache a first portion of the media file before beginning playback, ensuring that enough of the media file has been streamed to allow smooth playback to begin. The short initial delay may be only a minor inconvenience. However, if playback continually catches up with the portion of the media file that has been received, playback repeatedly will stop until enough of the media file has been received to resume playback, then start again. The resulting stopping and starting makes for choppy playback, and a less satisfactory user experience.

Where many client computers may rely on one or a few servers for provision of streaming content, the server or servers may not be able to match client demand, resulting in generally dissatisfying experiences. The proliferation of peer-to-peer networks, however, may alleviate some of these concerns. In a peer-to-peer network, computer systems may act as both servers and clients to offload the workload from conventional servers. For example, in a peer-to-peer network, a first computing system may be acting as a client to receive a streaming media file from a server. Subsequently, a second computing system in the peer-to-peer network may request the same streaming media file. If the first computing system detects the second computing system's request for the media file, the first computing system can begin streaming the media file to the second computing system. Thus, the first computing system acts as a server, and provides the streaming media to its client, the second computing system. This can be regarded as a "cache and relay system," with a first node receiving a streaming media file, caching the media file, and relaying it to other nodes seeking the same media file.

Regardless of the assistance of cache and relay systems in peer-to-peer networks, however, the access to a media file may not be smooth access when users do not access the streaming media in a linear manner. For example, if a user of one of the nodes performs a seek operation to jump forward to a later portion of the media file, other nodes in the neighborhood in the peer-to-peer network may not have the content the user seeks. If the user jumps ahead, no other nodes may have yet received and cached the desired portion of the file. Similarly, even if another node had cached the desired segment of the media file, that node may have released the earlier portion to free storage space to receive later portions of the streaming media.

SUMMARY

Seek support facilitates convenient access to portions of a media file a user wishes to access. Seek support is provided by a usage model based on prior users' access of the media file or expected user access patterns. The usage model reflects expected next segments a user will seek when accessing the media file. A prefetching model derived from the usage model reduces seeking delay by prefetching one or more expected next segments identified from the usage model that will result in minimal seeking distance. Correspondingly, a method of prefetching segments also facilitates access to the media file. A quantity of segments of a media file to be prefetched and a current region of a media file being access are identified. At least one next segment identified by the prefetching model as an expected next seeking destination from the current region is identified, and the next segment is prefetched.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

DETAILED DESCRIPTION

Overview

Embodiments of seek support allow users to seek different segments of a media file without delays in having to wait for a server to process and stream the portion of the media file being sought. Seek support recognizes that users who access audiovisual files or other media files, do not necessarily engage the content in a linear, start-to-finish manner. In the case of a movie, for example, users may skip forward from the beginning to see if the plot appears interesting. Similarly, users may skip to the end to see if they want to watch the whole movie. In addition, users who have watched the movie before, or who have other prior knowledge of the movie, may skip to particularly interesting scenes of the movie.

Seek support recognizes that empirical data of prior users' access to a media content manifests patterns indicating which segments of the media file users access more frequently and seek more frequently. From the usage data, a usage model is derived that reflects a probability of what segments a user will seek. From this data, a prefetching model is derived. The prefetching model indicates, from the current region or segment of the movie, what segments a user is likely to seek next. The prefetching model may be optimized, such as by using scalar quantization theory, to minimize the seek distance when seeking from one region of the media file to another.

Using the prefetching model, segments of the media file are prefetched. Prefetching considers a quantity of segments that are to be prefetched. The quantity of segments may be based on storage capacity, bandwidth, preferences, and other factors. The current region or segment currently being accessed is identified, and a set of next segments a user is likely to access are identified and prefetched. In one embodiment, a hierarchical prefetching model is used. In a hierarchical model, as a user seeks to a region of a media file where the prefetching model indicates a new set of segments are to be prefetched, and if there is not sufficient storage for the new set of segments, segments at more remote levels of the hierarchy from the destination of seek are released to clear space for the new set.

Operating Environment for Implementing Exemplary Embodiments

Figure 1:
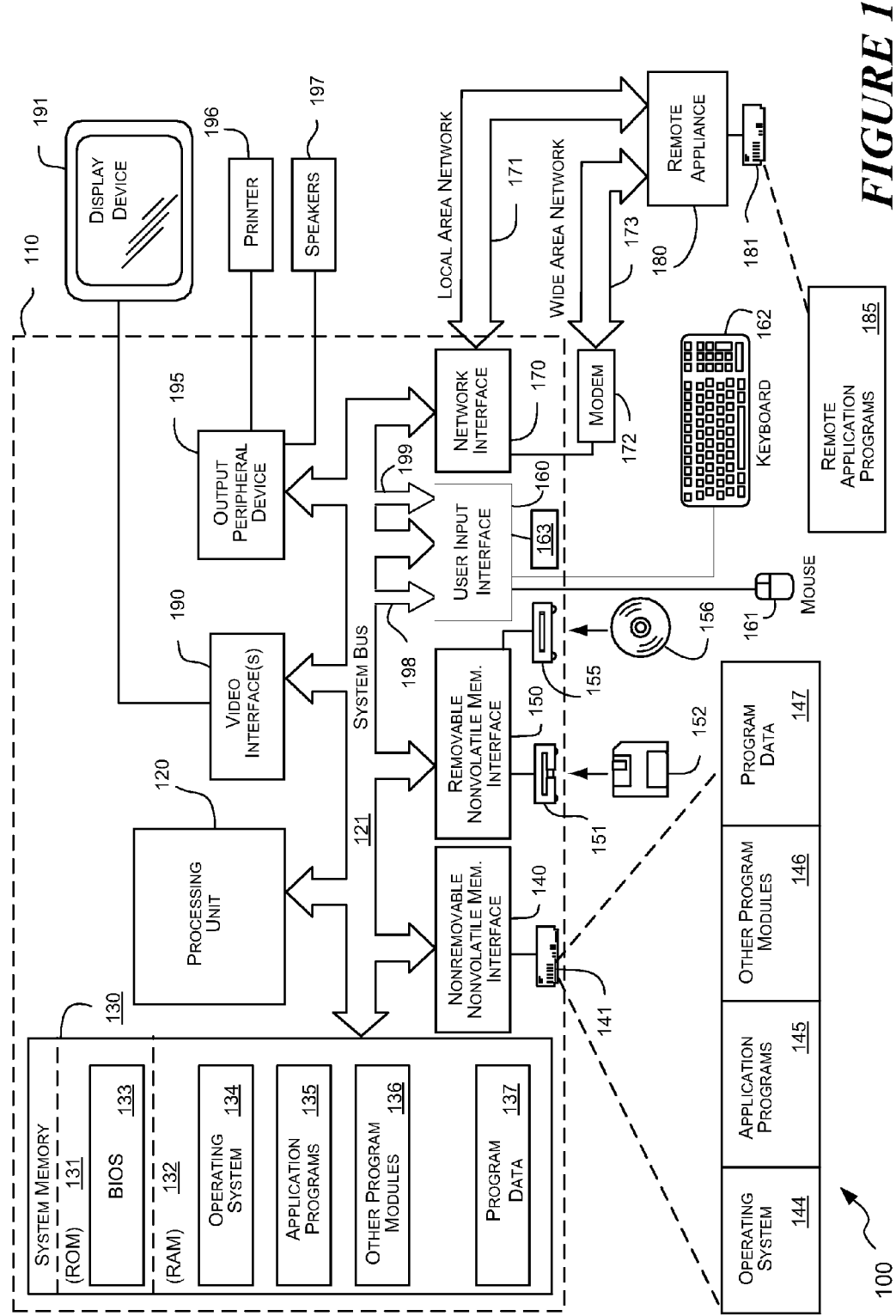
FIG. 1 is a block diagram of an exemplary operating environment suitable for evaluating empirical access data, determining prefetching models, retrieving segments to be prefetched, and accessing the media data.

FIG. 1 illustrates an exemplary operating environment 100 for developing or using prefetching to provide seek support. The operating environment 100 is only one example of a suitable operating environment and is not intended to suggest any limitation as to the scope of use or functionality of exemplary embodiments of seek support as previously described, or other embodiments. Neither should the operating environment 100 be interpreted as having any dependency or requirement relating to any one or combination of components illustrated in the exemplary operating environment 100.

Processes of implementing seek support may be described in the general context of computer-executable instructions, such as program modules, being executed in operating environment 100. Generally, program modules include routines, programs, objects, components, data structures, etc., that perform particular tasks or implement particular abstract data types. Moreover, those skilled in the art will appreciate that processes of implementing seek support may be practiced with a variety of computer-system configurations, including hand-held devices, multiprocessor systems, microprocessor-based or programmable-consumer electronics, minicomputers, mainframe computers, and the like. Processes of implementing seek support may also be practiced in distributed-computing environments where tasks are performed by remote-processing devices that are linked through a communications network. In a distributed-computing environment, program modules may be located in both local and remote computer-storage media including memory-storage devices.

With reference to FIG. 1, an exemplary operating environment 100 for implementing processes of seek support includes a computer 110 including a processing unit 120, a system memory 130, and a system bus 121 that couples various system components including the system memory 130 to the processing unit 120.

The computer 110 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical-disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 141 is typically connected to the system bus 121 through a nonremovable memory interface such as interface 140. Magnetic disk drive 151 and optical click drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs, and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 194 port, or a universal serial bus (USB) 198, or infrared (IR) bus 199. As previously mentioned, input/output functions can be facilitated in a distributed manner via a communications network.

A display device 191 is also connected to the system bus 121 via an interface, such as a video interface 190. Display device 191 can be any device to display the output of computer 110 not limited to a monitor, an LCD screen, a TFT screen, a flat-panel display, a conventional television, or screen projector. In addition to the display device 191, computers may also include other peripheral output devices such as speakers 197 and printer 196, which may be connected through an output peripheral interface 195.

The computer 110 will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary, and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Alternatively, the computer 110 may include a set-top box for a television similar display. Accordingly, additional details concerning the internal construction of the computer 110 need not be disclosed in describing exemplary embodiments of processes of implementing seek support.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

Analysis of Seeking Behavior

Conventionally, a media file is streamed to a client linearly, from start to finish. However, if a user does not access the media file linearly, and seeks ahead to another portion of the file that may not yet have been streamed, the data streamed to the user's system will not facilitate quick access to the desired portion of the media file. In this case, the server will suspend current streaming session and process the seek request, and begin streaming the portion of the media file that is the destination of the user's seek operation. The user will have to wait for the desired portion to be streamed and stored before the user can access it.

Usage data reflecting how users access media files show that users tend not to access media files linearly. For example, when watching movies, users frequently tend to seek ahead. Users tend to seek ahead to see if the movie develops to their liking, to find favorite scenes, or to see if the plot develops to their liking before investing a large amount of time in watching the movie.

User behavior may be studied from logs that track user activity, such as how frequently a particular portion of a film is viewed and what segments a user seeks. For example, Microsoft Windows Media Server™ streaming media server maintains detailed logs of user sessions. The logs track client events, including session setup, session teardown, fast forward, rewind, and seek operations that can be used to identify how frequently portions of a particular media file are viewed or how frequently a user seeks to them. By compiling the logs of user access to a media file, user access patterns for that media file emerge. The compiled usage data reflects how frequently each portion of the file is accessed, how often each was the source or destination of seek operations, and other factors. The access patterns are useful to predict how later users may access that file.

For illustration, FIGS. 2-5 depict exemplary histograms that represent collections of usage data for a selected media file. Three general points should be noted about the exemplary histograms. First, for the sake of the example, the media file is assumed to be a movie, although exemplary embodiments use techniques applicable to other audiovisual files, video files, audio files, or other media files. Second, the histograms are representative of what actual compiled usage data reflects, but the exemplary histograms do not actually represent usage data from any particular media file. Third, compiled usage data, particularly when the usage data collects representing the activities of hundreds or thousands of users who have accessed the file, may be much more detailed than depicted in FIGS. 2-5. However, although the histograms are simplified, they are sufficiently illustrative of compiled usage data to support embodiments discussed below.

Figure 2:
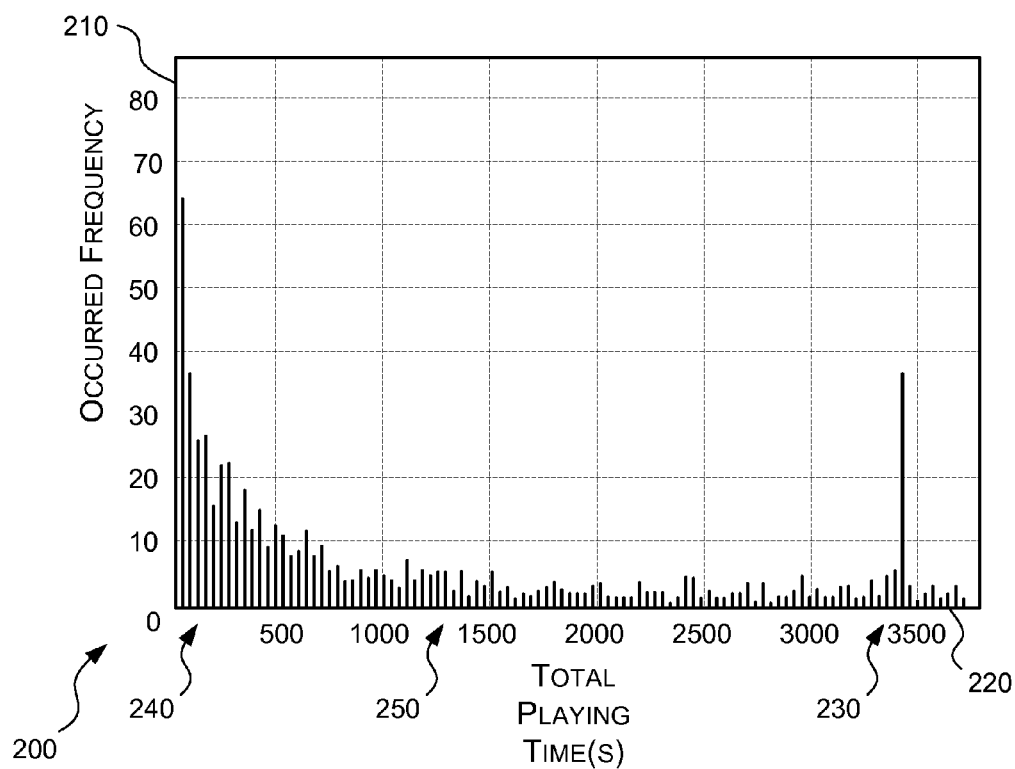
FIG. 2 is a two-dimensional histogram plotting a frequency of a total playing time each user played a movie the user accessed.

FIG. 2 is a histogram 200 that depicts a frequency, plotted on a vertical axis 210, of a total playing time, plotted on a horizontal axis 220, each user accessing the movie played the movie. The frequency, plotted on the vertical axis 210, is listed in terms of a number of occurrences, and the total playing time, plotted on the horizontal axis 220, is listed in seconds. In this example, the movie is approximately one hour in length, with the conclusion of the movie falling at approximately the 3500 second mark 230.

From the histogram, one can discern several observations. First, a set of short total playing times 240 are among the most common; in other words, it is common for a user to watch the movie for only a short time. Second, considering a second set of longer total playing times 250, at a time representing approximately one-third the total running time of the movie, the frequency of occurrences of total playing time tends to plateau. Third, at the 3500-second mark 230 that represents the total length of the movie, the frequency increases again, indicating a significant number of users watched the film to its conclusion.

One must note, however, that the total playing times plotted on the horizontal axis 220 of the histogram 200 does not reflect that the users started playback from the beginning of the movie and linearly watched the movie from its beginning until the conclusion of the movie. The higher occurred frequency of shorter total playing times 240 may reflect users who access the movie only to play one or a few parts of the movie.

Figure 3:
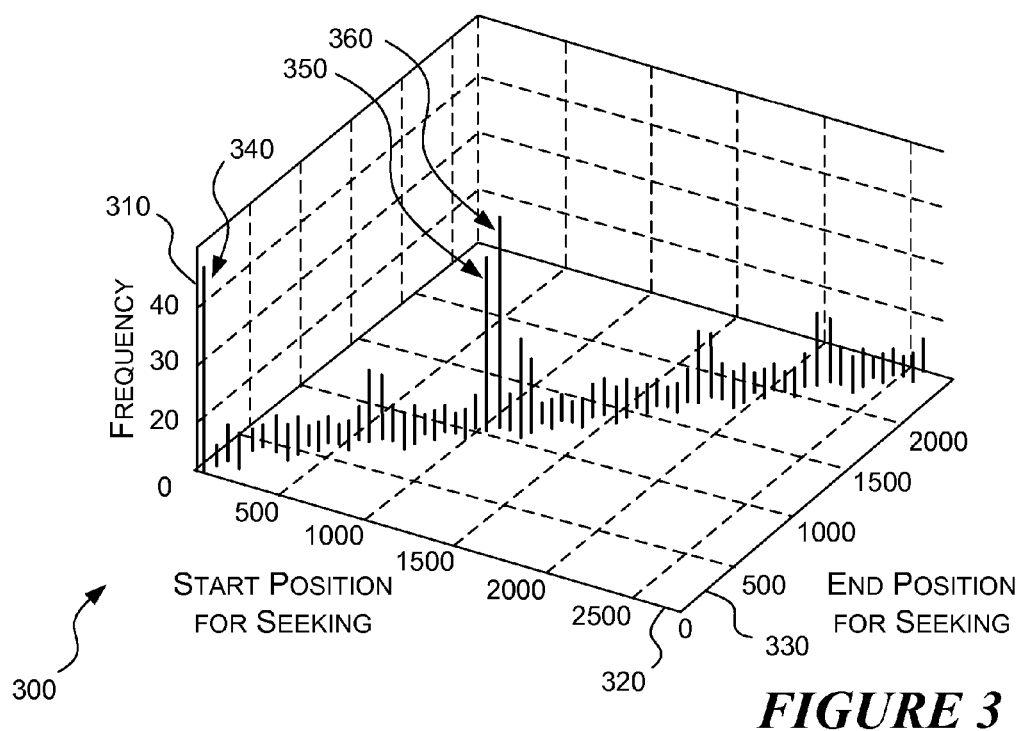
FIG. 3 is a three-dimensional histogram plotting a frequency with which a seeking operation is performed from each possible start position through each possible end position.

FIG. 3 is a three-dimensional histogram 300 that depicts a frequency, plotted on a vertical axis 310, of start positions for seeking, plotted on one horizontal axis 320, and end positions for seeking, plotted on an orthogonal axis 330. Start and end positions for seeking below a threshold frequency are omitted from the histogram for visual clarity.

The histogram 300 shows that a starting point 340 of the movie frequently was a starting point for seeking. Subsequent points 350 and 360 in the movie frequently were end points for seeking. Other points in the movie manifested fewer spikes in frequency, but there is a somewhat linear relationship plotting a frequency with which a seeking operation is performed from each possible start position through each possible end position.

Figure 4:
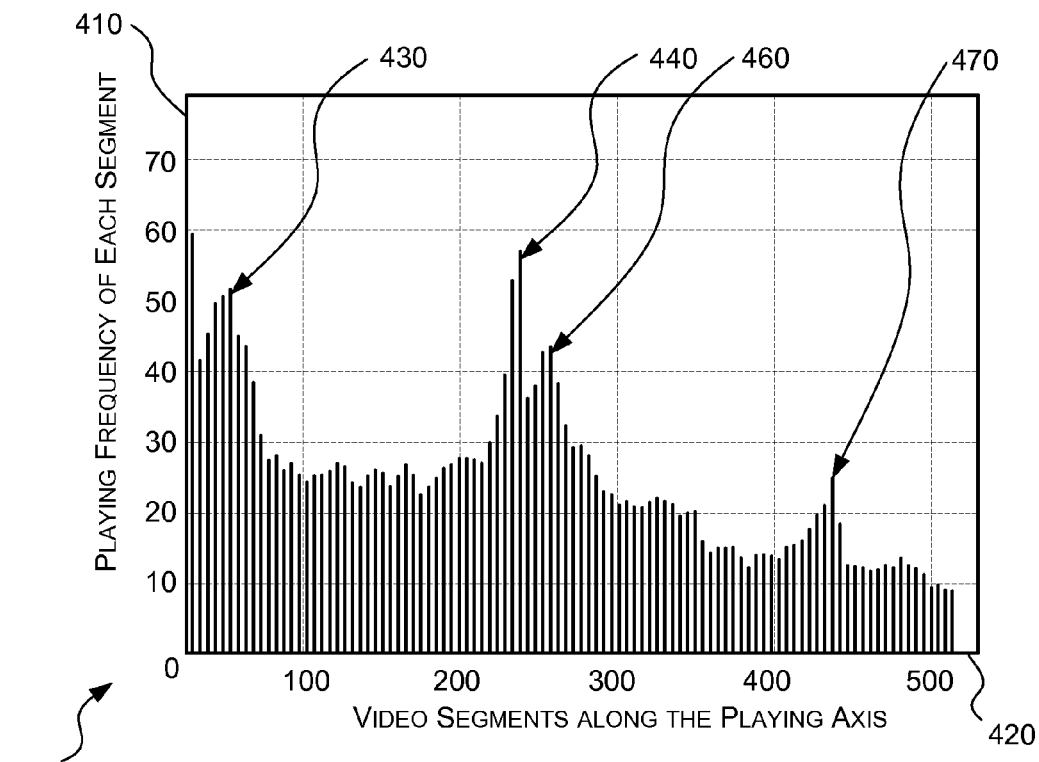
FIG. 4 is a two-dimensional histogram plotting a playing frequency of each of a plurality of segments of a video file.

From the histogram 300, one may deduce certain user behaviors. First, the relatively linear correlation of most points as start and end positions for seeking indicates some random seeking behavior by users. Users may seek from one point in the movie to a next point in the interest of time or out of impatience to seek what occurs next. Second, the high frequency of short playing times 240 (FIG. 2) may result from users with knowledge of the movie starting playback of a movie in order to seek to particular desired scenes. For example, from the starting 340 of the movie, users might seek to a desired scene of the movie, such as the scene of the movie at point 350. Then, the user might seek to a next desired scene of the movie, such as the scene of the movie at point 360. From the point 360, the user may then seek another scene. As a result, there is a high frequency of the starting point 340 of the movie being a start position for seeking, and the subsequent points 350 and 360 having a high frequency as both start positions and end positions for seeking. From these observations, one can conclude that seek behavior is prevalent FIG. 4 is a two-dimensional histogram 400 depicting a frequency, plotted on a vertical axis 410, of playing of a plurality of segments of a movie, plotted on a horizontal axis 420 relative to the position of each of the segments within the movie. In order to analyze user access behaviors, it is convenient to divide the movie or other media file into time segments. The media file may be divided into equal time segments. In the example of histogram 400, the movie is divided into 10-second segments, such that there are over 500 10-second segments in a movie that plays for just under one and one-half hours. From the histogram, it is clear that some segments are viewed more frequently than others. Based on the playing frequency, several segments of the movie, such as segments 430-470, are viewed more frequently than most other segments.

Figure 5:
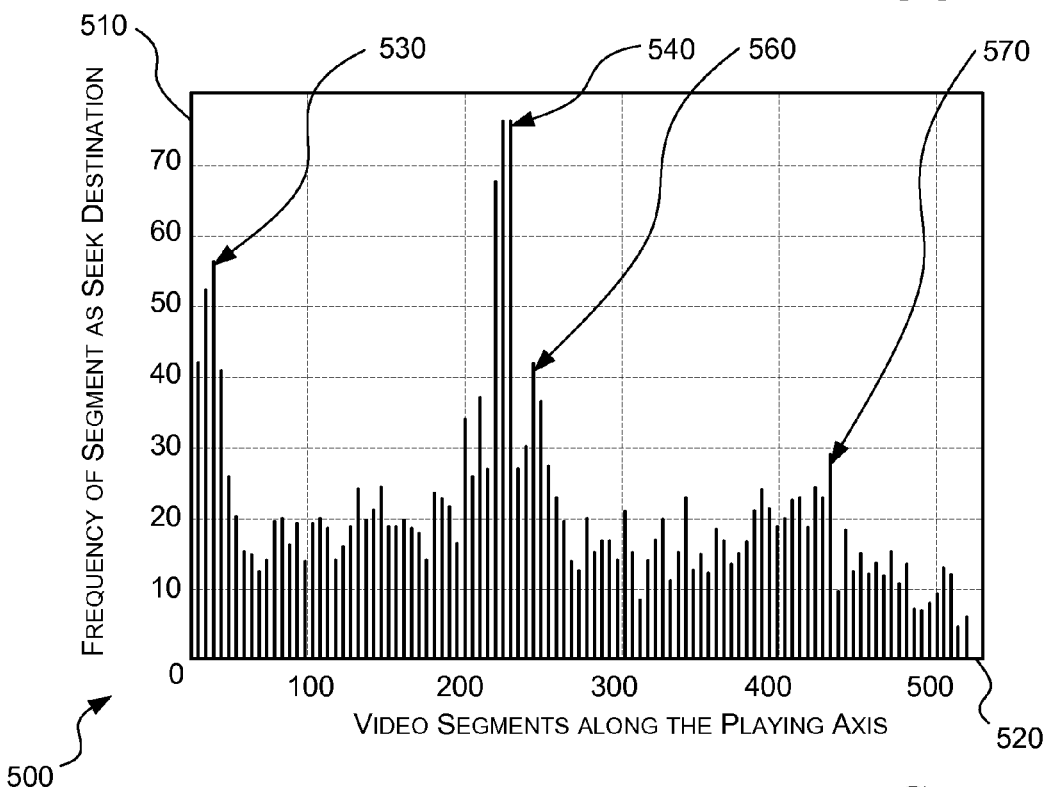
FIG. 5 is a two-dimensional histogram plotting a seeking frequency of which each of a plurality of segments of the video file is a destination.

FIG. 5 is a two-dimensional histogram 500 depicting a seeking frequency, plotted on a vertical axis 510, of a plurality of segments of the same movie, plotted on a horizontal axis 520 relative to the position of each of the segments within the movie. More specifically, the histogram depicts the frequency with which the segments are a seeking destination. Based on the seeking frequency, several segments of the movie, such as segments 530-570, are a seeking destination more frequently than most other segments. From the histogram 500, there is some correlation between the playing frequency of segments (FIG. 4) and the seeking destination frequency of the segments (FIG. 5).

The observations drawn from the histograms of user access show that users should not be assumed to linearly watch a movie or engage a media file from beginning to end. Instead, users perform many seek functions. Moreover, from the usage data, one can identify what segments of the media file subsequent users may seek.

Using this data, guided seek support may be provided by devising a prefetching model based on the usage data that identifies segments a user is likely to seek. Using the prefetching model, instead of solely prefetching next segments along the playing axis or timeline, segments that represent popular seeking destinations may be prefetched. Accordingly, when a user performs a seek operation, the prefetching model may already have caused popular, nonsequential segments to have been prefetched, so that the user can seek to those popular segments without delay.

Development of a Prefetching Model

Figure 6:
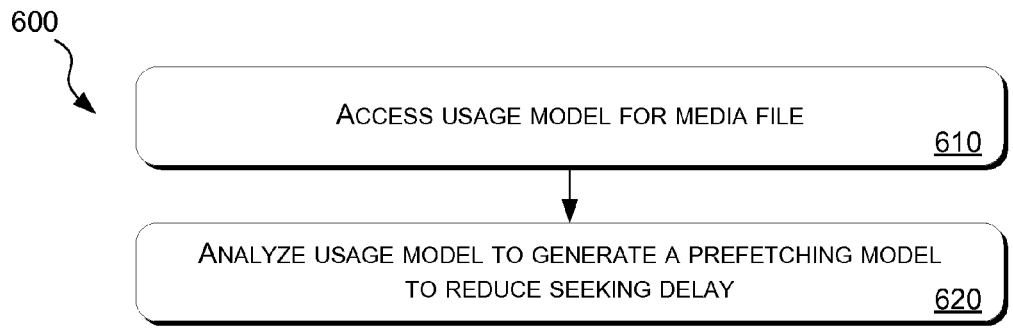
FIGS. 6 and 7 are flow diagrams of modes of determining a prefetching model based on empirical data of user access to the media file.

FIG. 6 depicts a mode of developing a prefetching model. The prefetching model may be based on an empirical usage model or an initial usage model. An empirical usage model is based on historical data based on the manner in which a plurality of users has accessed a selected media file. The usage data may be collected by retrieving statistics maintained by a server or other source of the media files. As previously described, Microsoft Windows Media Server™ streaming media server maintains statistics regarding access to media files. Other software or systems also may be used to track historical usage data for a plurality of users. As exemplified in the histograms 200-500, the historical usage data will reflect trends that indicate which portions of a media file a future user may seek. As generally is the case in compiling statistics, the larger the number of users whose behavior is manifested in the historical usage data, the more representative and reliable the resulting usage model may be in predicting future behavior.

Alternatively, the usage model may include an initial usage model that reflects which segments users are expected to access or are expected to be seeking destinations. An initial model may be created by the creators or distributors of the media file to be used for newly available media files or available media files that have not yet been accessed by a threshold number of users. It will be appreciated that an empirical usage model based on how one or a few users have accessed the media file may not be representative of how a large number of users might access the same media file. Thus, until a selected number of users have accessed the file to present a body of representative usage data, the initial usage model may continue to be used to provide seek support.

It will also be appreciated that the usage model may include a combination of an initial model and an empirical model. An initial model could be augmented with data representing the access behaviors of early users. Thus, an empirical model may be, at least initially, based on the initial model. Over time, the empirical data collected may corroborate the predicted behavior information represented in the initial model. Alternatively, data reflecting actual user behavior will supersede the predicted behavior information, resulting over time in an appreciably different usage model.

Referring again to FIG. 6, a 610, a usage model for the media file, either an empirical usage model or an initial usage model, is accessed. At 620, the usage model is analyzed to identify a prefetching model. The usage model indicates what portions of a media file users are likely to seek. Based on this data, the prefetching model is devised by minimizing the seeking distance in accessing portions of the media file a user may be expected to seek.

Figure 7:
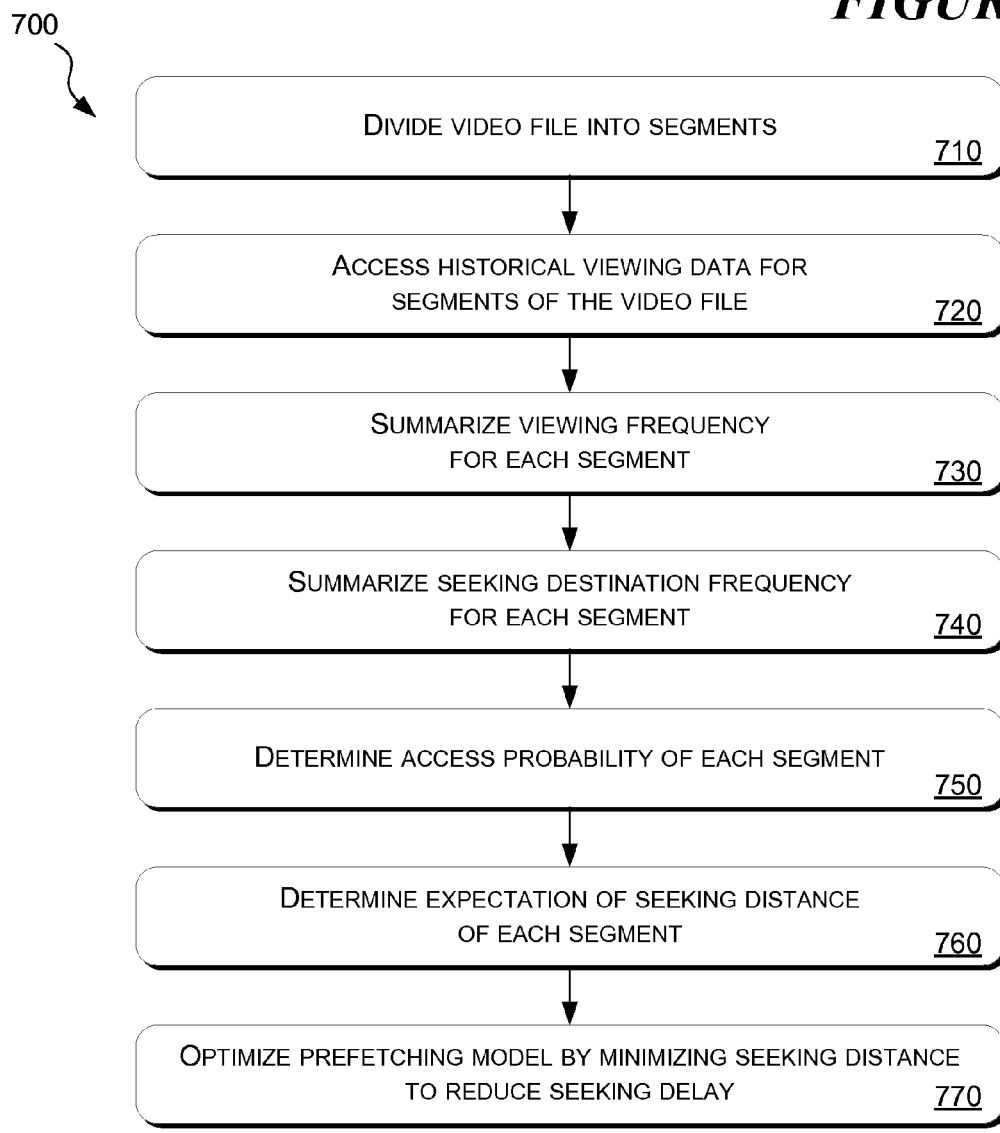

FIG. 7 illustrates an embodiment of the invention by which an exemplary mode 700 of identifying a prefetching model to reduce seeking distance is generated. In the exemplary mode 700 of FIG. 7, the prefetching model is developed for a video file viewed by users. Thus, the historical usage data reflects how users viewed portions of the video file and performed seeking operations to view other portions of the video file. Nonetheless, the embodiment described similarly may be applied to an audio file a user would access by listening to the file and performing seek operations to listen to other portions of the file, or applied to other media files.

At 710, a video file for which a prefetching model is to be developed is divided into segments. The segments may be of equal length. Dividing the video into segments may be performed by the system logging the usage data, or the usage data could be processed to correlate usage data based on timestamps associated with the video file to the segments within which the timestamps fall. In one mode, computation involved in generating the prefetching model is simplified by reducing the usage data to a selected, discrete level of granularity. For one example, as previously discussed, dividing a video file into a series of 10-second segments provides a desirable level of granularity in seeking operations while reducing the usage data to a manageable quantity. At 720, the historical usage data, which in this case is viewing data, is accessed.

Using a system such as Microsoft Windows Media Server™ streaming media server, historical data may be available for each of the segments as to the frequency with which each was played, was the start of a seeking operation, and was the end or destination of a seeking operation. The frequency with which each segment x is viewed or played is termed $P_p(x)$. The frequency with which each segment x was a destination of a seek operation from a source segment y is termed $P_s(y, x)$. The frequency with which each segment x was a destination of a seek operation, regardless of the segment which was the source of the seek operation, is termed $P_s(x)$.

Statistically summarizing the data for termed $P_s(y, x)$ results in a much larger quantity of data. For example, in a video file having 500 segments, there are nearly 250,000 combinations of seeking start and end combinations. Not only does this larger data set increase the computational burden to statistically summarizing the data, but the expanded data set also may obscure user access patterns, or require a much larger data set before such patterns will emerge. Put another way, many users may seek a particular segment x, but if those users seek segment x from source segments $y_1, y_2$, through $y_n$, the frequency with which segment x was sought may be less apparent from the data.

By contrast, the pattern yielded by $P_p(x)$ represents a marginal distribution of $P_p(y, x)$. It yields a smaller set of data with which to work, and provides a useful representation of user seeking behavior. Thus, in one mode, $P_p(x)$ is used in devising the usage model rather than using $P_p(y, x)$.

At 730, the viewing frequency of each segment within the video file is summarized, yielding a representation of the usage data that is thematically like that of the histogram 400 (FIG. 4). At 740, the seeking frequency of each segment as a seeking destination is summarized, yielding a representation of the usage data that is thematically like that of the histogram 500 (FIG. 5).

At 750, an access probability function for each segment, p(x), is determined from the usage data. The probability function may be based on the playing frequency of a segment, the seeking frequency of a segment, or both the playing frequency and seeking frequency of a segment. In one mode, the probability function for each segment x is based on a product of the playing frequency $P_p(x)$ and the seeking frequency $P_s(x)$, as given by Eq. 1:

$$p(x) = C \times P_p(x) \times P_s(x) \qquad (1)$$

In Eq. 1, C is a normalization factor. Note that C is present for mathematical correctness of equation. In practice, it can be chosen to be arbitrarily positive number for the sake of convenience of implementation because p(x) is used to indicate a relative likelihood. For example, C can be chosen to be 1.

Figure 8:
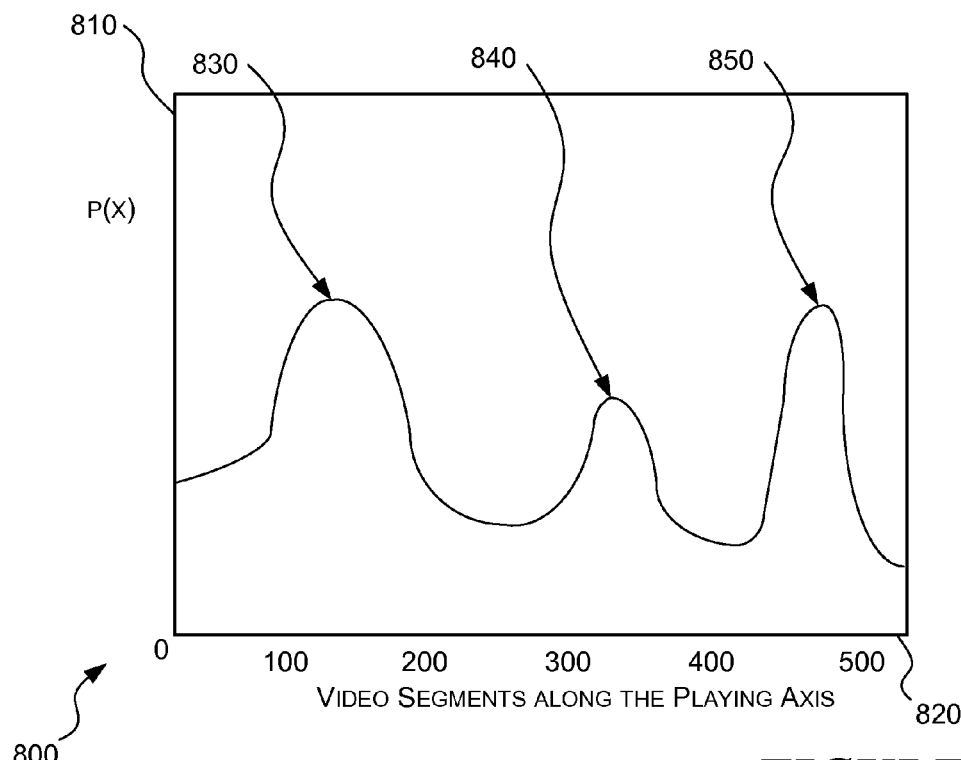
FIG. 8 is a graph of a probability function representing a probability of segments being accessed or being seeking destinations.

Determining the probability function p(x) may yield probability data representable, for example, as in the graph 800 of FIG. 8. The graph depicts the probability function p(x), plotted along a vertical axis 810 for each of the segments, plotted along a horizontal axis 820 according to the position of each segment in the playing axis. The probability function p(x) thus yields values that reflect the relative likelihood, based on historical usage data, that each of the segments will be viewed by or be the destination of seeking operations of future viewers. The graph 800 shows that segments at points 830, 840, and 850 are segments likely to be desired by future users.

At 760, an expectation of the seeking distance between segments is determined. The seeking distance is a function of the segment x which is the seeking destination and the prefetching model g(x) that is selected. Thus, the seeking distance is expressed as d(x, g(x)). Within the set of segments $L_T$, the expectation of the seeking distance $D_g$ is given by Eq. 2:

$$D_g = E\{d(x, g(x)) | x \in L_T\} = \int_{x \in L_T} d(x, g(x)) p(x) dx \qquad (2)$$

At 770, the prefetching model is optimized by minimizing the seeking distance for each segment as a destination segment. The optimized prefetching model is given by Eq. 3:

$$\tilde{g} = \underset{g}{\operatorname{argmin}} \{E\{d(x, g(x)) | x \in L_T\} \qquad (3)$$

Optimization may be accomplished in a number of ways. In one mode, the prefetching model is optimized using scalar quantization, as described in the next section.

Optimization of the Prefetching Model

The prefetching model may be optimized in a number of ways. For example, one intuitive approach suggests that the prefetching model should cause segments at regularly-spaced intervals throughout the media file to be prefetched. The resulting model would minimize the distance between segments, and provide regular access points throughout the media file. However, to take advantage of the patterns in user viewing and seeking behavior to be gleaned from the usage data, as exemplified in the histograms 200-500 of FIGS. 4-5, the optimization function should consider the frequency with which segments are played and are destinations of seeking operations.

Figure 9:
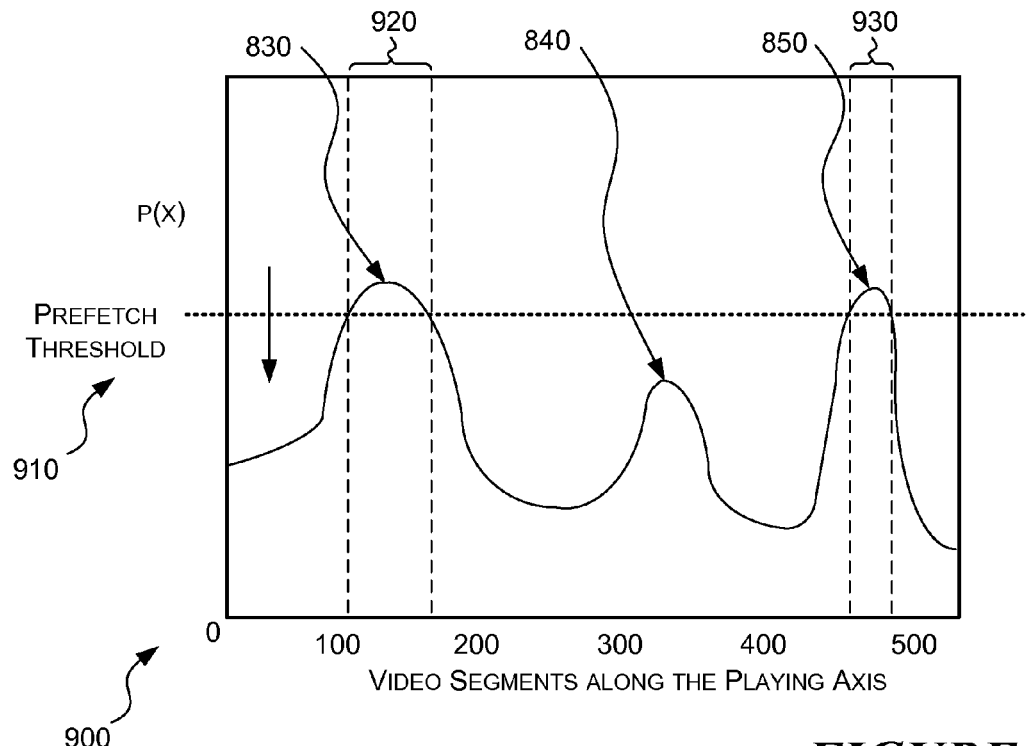
FIG. 9 is a graph of a greedy algorithm for prefetching segments as applied to the probability function of FIG. 8.

To prefetch the more frequently accessed or sought segments, a greedy, "inverse water-filling" algorithm could be used to identify optimal segments for prefetching. FIG. 9 illustrates a graph 900 of the greedy algorithm applied to a probability function p(x) as illustrated in the graph 800 of FIG. 8. Using the greedy algorithm, a prefetch threshold 910 is reduced until it intersects the probability function p(x) at a point that identifies a number of segments for prefetching. The number of segments for prefetching may be determined by bandwidth, storage, and other resources that limit how many segments are desired for prefetching at one time. The segments in a first range 920, about the point 830, and a second range 930, about the point 850, are bounded by the probability function p(x) and the prefetch threshold 910. The greedy algorithm thus indicates that the segments within the ranges 920 and 930 should be prefetched.

However, the greedy algorithm may not be optimal for all cases. For example, the graph 900 shows that the greedy algorithm will cause all the segments within the ranges 920 and 930 to be prefetched. This actually may be overly inclusive, because once a user has performed a seek operation to one of the segments at points 830 and 850, additional segments in the appurtenant ranges 920 and 930, respectively, would be streamed to maintain the flow of the media file. On the other hand, segments adjacent to point 840, which the probability function p(x) indicates as being only slightly less likely to be desired, will never be prefetched.

Scalar quantization, best known for its applications in image and video compression, is useful in optimizing the prefetching model. Using scalar quantization, each of the samples in a source signal is quantized into one of a plurality of reconstruction values in a pre-designed codebook. A quantizer q is characterized by the number of quantization levels, L, the boundary values, $b_l$, where $l=0, 1, \ldots L$ and reconstruction values $g_l$, where $l=1, 2, \ldots L$. The boundary values establish the partition regions $B_l=[b_{l-1}, b_l)$. Letting $L_T$ represent the set $\{1, 2, \ldots L\}$, the quantization function is then given by Eq. 4:

$$Q(f)=g_l, \forall f \in B_l, l \in L_T \quad (4)$$

The distortion $D_q$ of the quantizer q is defined as the average distance between the original and the quantized samples, as given by Eq. 5:

$$D_q = E\{d(f, Q(f))\} = \int_{f \in B} d(f, Q(f))p(f)df \quad (5)$$

In Eq. 5, B represents the set of all possible samples.

Under scalar quantization theory, the optimal scalar quantization problem is finding the partition regions $B_l$ and the reconstruction values $g_l$ for a specified number of quantization levels L such that the distortion metric defined in Eq. 5 is minimized by identifying a quantizer q as defined by Eq. 6:

$$\tilde{q} = \underset{Q}{\operatorname{argmin}} \{E\{d(f, Q(f))|f \in B\} \quad (6)$$

Scalar quantization theory further states that the reconstruction values lie at the centroids of the partition regions between the boundary values. The boundary values and the reconstruction values should satisfy the nearest-neighbor condition given by Eq. 7:

$$B_l = \{f : d(f, g_l) \leq d(f, g_{l'}), \forall l' \neq l\} \quad (7)$$

In addition, the reconstruction values should satisfy the centroid condition given by Eq. 8:

$$g_l = E\{f | f \in B_l\} \quad (8)$$

Applying scalar quantization to optimize the prefetching model, the object is to minimize the seeking distance given by Eq. 1, and thereby minimize the seeking distance. By contrast, the object of scalar quantization is minimizing the distortion. Comparing Eq. 3, which describes the seek distance minimization problem, and Eq. 6, which describes the distortion minimization problem, parallels can be drawn. Specifically, the seeking distance function d(x, g(x)) can be mapped to the distortion function d(f,Q(f)), with the segments x to be prefetched being substituted for the samples f. In addition, the partition regions addressed in scalar optimization can be analogized to the division of the whole playing period of a media file, with each of the divisions including a prefetched segment. Thus, when a user performs a seek operation, the user can be considered to seek to a partition region, where what the user actually seeks is a segment in that region. When the user browses the media file, the prefetched segment can be used to represent the region in which the prefetched segment is included.

In one mode, optimization of the scalar quantization problem can be solved using a Lloyd algorithm. Details of the nature and operation of the Lloyd algorithm can be found, for example, in P. Lloyd, "Least squares quantization in pcm," IEEE Trans. Inform. Theory, IT-28:127-35 (March 1982), and A. Gersho and R. Gray, "Vector Quantization and Signal Compression," Kluwer Academic Press, Boston, Mass. (1992). Thus, for a given number of segments to prefetched, L, a Lloyd algorithm can be used to solve the optimization problem of Eq. 3 to optimally determine which segments should be prefetched and generate a prefetching model or scheme, "Prefetching_scheme":

Prefetching_scheme(L, B, p(x))

divide region B uniformly into L sub-regions

For each sub-region:

$$g_l \leftarrow \sum_{x \in B_T} xp(x)$$

Seeking distance:

$$D \leftarrow \frac{1}{K} \sum_{l \in L_T} \sum_{x \in B_l} d(x, g_l)$$

do $D_{last} \leftarrow D$ foreach sub-region $$g_l \leftarrow \sum_{x \in B_T} x p(x)$$

foreach sub-region
 update the boundary value $b_l \leftarrow (g_l + g_{l+1})/2$
Seeking distance:

$$D \leftarrow \frac{1}{K} \sum_{l \in L_T} \sum_{x \in B_l} d(x, g_l)$$

while abs$(D - D_{last}) \geq V_{threshold}$
return $g_l$ l=1, 2, ... L

The synthetic probability function p(x) is used as the probability distribution function in Lloyd algorithm.

Hierarchical Prefetching of Segments

The number of segments to be prefetched L may be limited by hardware and network constraints, may be restricted by user preferences as to resource allocation, and may be adapted based on the usage data for the media file as manifested in the probability function p(x).

In a network where no such constraints exist, L ideally would be as large as possible; if every segment were prefetched, the user would have virtually instantaneous access to every segment in the media file. However, because networks are subject to constraints, L includes only a subset of the full set of segments in the entire media file, $L_T$. The number of segments to be prefetched L, in one mode, may be left as a configurable system parameter. It is desirable to determine a workable value for L, and prefetch L segments to optimize the user's experience in accessing a media file. Which segments should be prefetched should be adapted relative to the point in the media file currently being accessed. Similarly, a cache replacement policy should be recognized to determine which previously prefetched segments should be released in order to store other segments that are more appropriately prefetched relative to the point in the media file currently being accessed.

Figure 10:
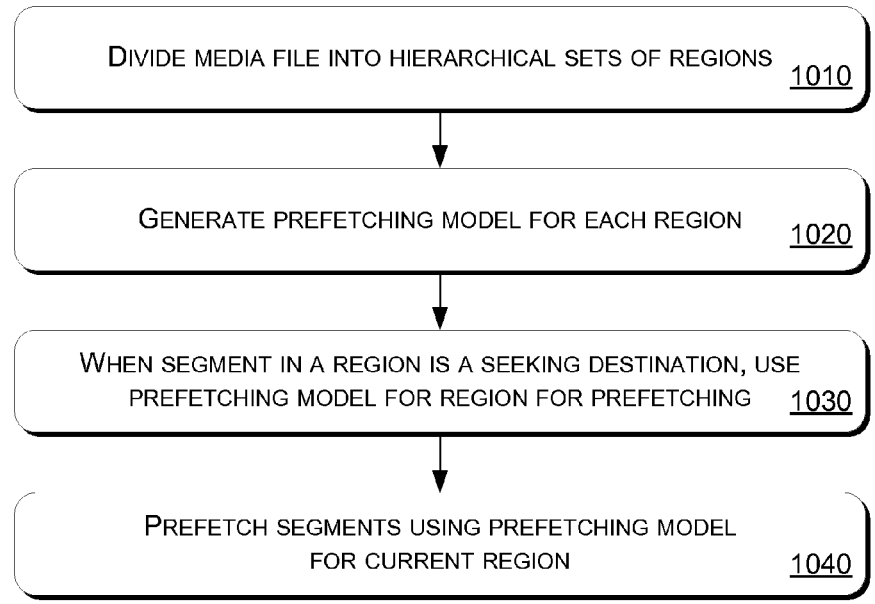
FIG. 10 is a flow diagram of a mode of prefetching segments of a media file according to a prefetching model based on a current region being accessed.

FIG. 10 illustrates one mode of hierarchical prefetching used to optimize what segments are prefetched based on the region of the media file currently being accessed by the user. At 1010, the media file is divided into one or more hierarchical sets of regions. At 1020, a prefetching model is generated for each region or subregion. With these prefetching models generated, at 1030, as a segment in a region is a prefetching destination, the prefetching model for that region is used for prefetching other segments to replace some or all of the segments previously prefetched to optimize further seeking from the current region. At 1040, segments are prefetched according to the prefetching model for the current region.

As a user performs a seek operation within the media file, the prefetching model for the media file as a whole may not be optimal for the point in the media file currently being accessed. For example, if the user seeks to a point toward the end of the media file, segments that might have been likely seek destination when the media file was accessed at a point toward the beginning of the media file may no longer represent likely seek destinations. Thus, a prefetching model should be generated for each of these regions that includes segments that represent likely seek destinations at this point. This recursive generation of prefetching models is repeated for each of a number of hierarchical levels. Thus, as a user performs further seeks, a prefetching model for the further subregion of which the destination segment is a part further optimizes prefetching at this point of the media file.

The maximum number of segments to be prefetched at any one time is L. When the media file is accessed, the initial value for the number of segments L is set to $L^{(0)}$, which may be a function of the length of the media file, the available storage for prefetching segments, a number of peaks in a probability function p(x) representing seeking behavior in the usage data, and other factors. For the number of segments to be prefetched, a support region R is chosen for which a prefetching model will be generated. Thus for the initial number of segments to $L^{(0)}$, the initial support region is $R^{(0)}$. The $L^{(0)}$ segments are ordered according to the popularity manifested in the probability function p(x). In one mode, the segments to be prefetched is biased to manifest users' bias to seek forward in the media file rather than backward.

Once a user performs a seek operation to a destination in the media file, the segment is considered to be in a region $B_l^{(k)}$, which is a region l within a hierarchy level k. The current region $R^{(k)}$ then becomes the new support region, and a prefetching model is generated recursively by applying the foregoing method to determine region $L^{(k)}$ segments to be prefetched.

In one mode, upon moving from one hierarchy level to another, the number of segments to be prefetched according to the prefetching model for a region or subregion may be less the total number L of segments to be prefetched. At lower levels in the hierarchy, it may not be necessary to prefetch as many segment to support seek access as would be desired at a higher level spanning more of the media file. A function to determine the number of segments to be prefetched upon moving from one hierarchy level to another is given by Eq. 9:

$$L^{(k)} = \lambda(L^{(k-1)}) \qquad (9)$$

In Eq. 9, k is the hierarchy level and λ is the function. Although many functions are suitable, to reduce the bandwidth and storage used, the function decreases in magnitude as the magnitude level increases. Thus, for example, one suitable function is given by Eq. 10:

$$L^{(k)} = \frac{(L^{(k-1)})}{2} \qquad (10)$$

Pseudo code for an exemplary prefetching scheme adapts the segments being prefetched according to the hierarchy level as follows:

```
seek_to(x)
    while region_stack.top( ) does not cover x
        foreach segment in region_stack.top( )
            segment.set_to_be_replaced_out( )
        region_stack.pop( )
        level_stack.pop( )
    end while
    if region_stack.size( ) < max_hierarchy_level
        B ← region_stack.top( ).subregion(x)
        L ← λ(level_stack.top( ))
        prefetching_sche (L, B, p)
        region_stack.push(B)
        level_stack.push(L)
        Order_Prefetching_Segments( )
        Start_Prefetching( )
    end if
```

Figure 11:
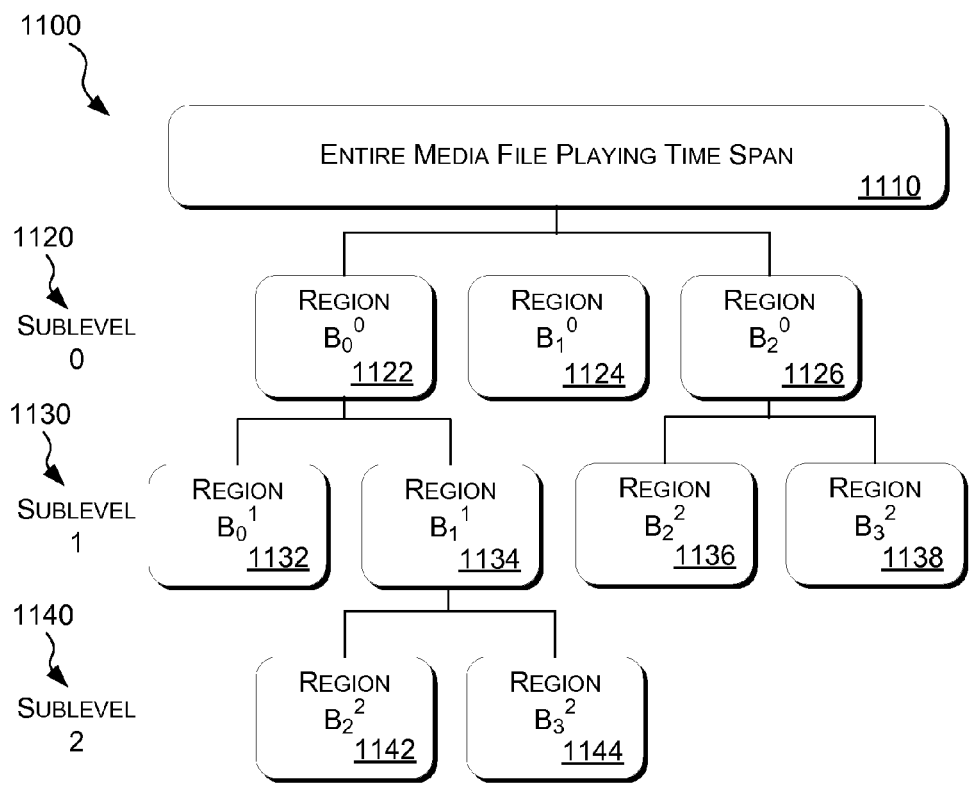
FIG. 11 is a block diagram representing a hierarchy of regions of a media file used as a basis for prefetching segments of the media file based on a region of the media file currently accessed.

Operation of such a hierarchical prefetching scheme is described with regard to the exemplary hierarchy of FIG. 11. At a top of the hierarchy 1100 is the entire media file 1110, across its entire playing time span. If the initial prefetching level is three, then three partition regions are defined, including on a first level, level 0 1120, region $B_0^0$ 1122, region $B_1^0$ 1124, and region $B_2^0$ 1126. Each of these regions includes a prefetched segment. A prefetching model is generated for each of these regions 1120-1126. As a result, when a user seeks to a segment within one of the regions 1120-1126, the prefetching model for that region is used to replace some or all of the segments that were prefetched according to the prefetching model at the previous hierarchy level. Similarly, when a user seeks to another segment within region $B_0^0$ 1122, a prefetching model for a region on a next sublevel, such as region $B_0^1$ 1132 on sublevel 1 1130, is used to direct prefetching to replace some or all of the previously prefetched segments. If the user seeks to region $B_1^1$ 1134, then seeks to a segment within region $B_2^2$ 1142 or region $B_3^2$ 1144 on sublevel 2 1140, prefetching models generated for these regions are used for further prefetching. Likewise, if the user seeks to region $B_2^0$ 1126, then seeks to a segment within region $B_2^2$ 1136 or region $B_3^2$ 1138 on sublevel 1 1130, prefetching models generated for these regions are used for further prefetching. If the user performs a seek to another region, the process repeats, starting at a first sublevel including the region including the seek destination. The prefetching model for that region is used, and as the user seeks to another segment within the region, prefetching models for regions on lower hierarchical levels as are used to direct prefetching.

In the hierarchical prefetching scheme, the function of Eqs. 9 and 10 are used to determine the number of segments to be fetched upon moving from one level of the hierarchy to the next. Again, considerations such as the storage available for storing prefetched segments will limit how many segments are prefetched. For a maximum hierarchy depth K, segments for each level of the hierarchy will be prefetched, leading to a greatest number of segments, S, to be prefetched. The value of S is given by Eq. 11:

$$S = L^{(0)} + L^{(1)} + K + L^{(K)} \quad (11)$$

Substituting for $L^{(k)}$ according to Eq. 9, where $L^{(0)}$ represents the number of segments to be fetched initially, the function of Eq. 11 can be rewritten as given by Eq. 12:

$$S = L^{(0)} + \lambda(L^{(0)}) + K + \lambda^{(K-1)}L^{(0)} \quad (12)$$

Thus, the segments to be prefetched is controlled by the parameter K, which represents the number of hierarchy levels selected, and $L^{(0)}$, the number of segments to be initially prefetched. Substituting in Eq. 12 the value of $L^{(k)}$ from Eq. 10, Eq. 13 gives the limit of the total number of segments to be prefetched:

$$S < \lim_{K \to \infty} \frac{2^K - 1}{2^{K-1}}(L^{(0)}) = 2L \quad (13)$$

The hierarchical prefetching scheme is independent of the prefetching algorithm proposed here; any other scheduling algorithm can be used with the hierarchical prefetching scheme.

Figure 12:
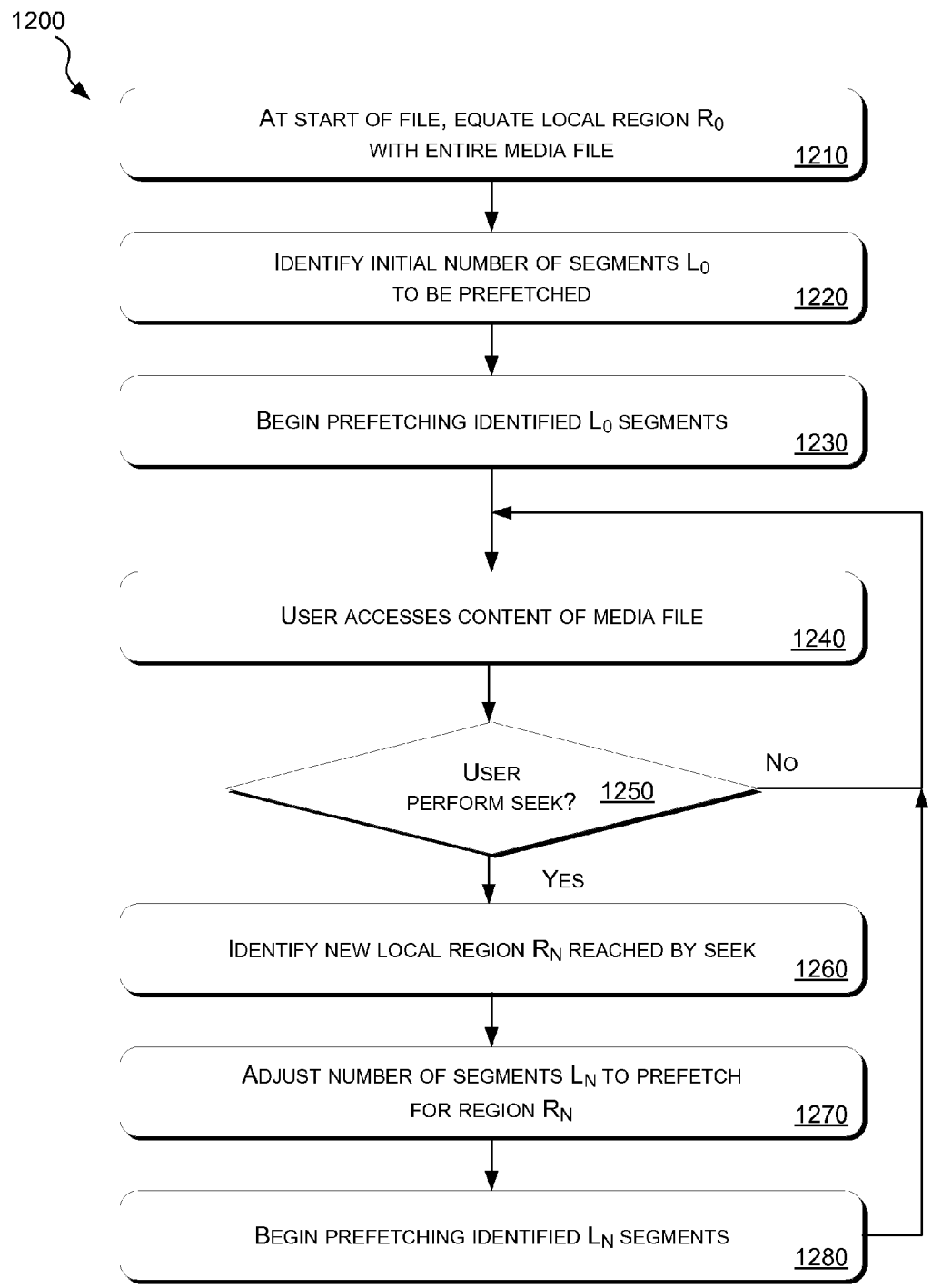
FIG. 12 is a flow diagram of a mode of prefetching segments of a media file hierarchically by region.

An exemplary method of performing a prefetching scheme 1200 is illustrated at FIG. 12. While one or more methods are disclosed, the elements of the described methods do not have to be performed in the order in which they are presented and an alternate order may result in similar advantages. Moreover, the methods are not exclusive and can be performed alone or in combination with one another. The described method may be performed by any appropriate means including, for example, by execution of processor-readable instructions recorded on a processor-readable storage medium.

In one embodiment, a method 1200 of prefetching segments of a media file hierarchically by region is illustrated. At block 1210, beginning at the start of the media file, a local region $R_0$ is equated with the entire media file. At block 1220, an initial number of segments $L_0$ is identified to be prefetched. At block 1230, the process of prefetching the identified $L_0$ segments begins.

According to the embodiment, at block 1240 the user accesses content of the media file. At block 1250, a determination is made as to whether the user performs a seek operation on the media file. If it is determined that the user is not performing a seek, then the method continues with the user accessing content of the media file at block 1240.

However, if it is determined that the user is performing a seek, then at block 1260, a new local region $R_N$ is identified, where $R_N$ represents the region reached by the user's seek. Then, at block 1270, the number of segments to prefetch is adjusted for the region $R_N$, the number of segments now being $L_N$. At block 1280, the process of prefetching the identified $L_N$ segments begins. The method then continues with the user accessing content of the media file at block 1240, with the steps at blocks 1250-1280 following as described above.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A computer-implemented method, comprising:
   identifying a quantity of segments of a media file to be prefetched;
   generating a usage model reflecting expected next segments a user will seek when accessing a media file, the usage model including one of:
   an empirical usage model statistically summarizing usage data representing a manner in which prior users have accessed segments of a media file, an initial usage model representing a predicted manner in which users are expected to access segments of the media file, and the initial usage model augmented by the usage data representing the manner in which users have accessed segments of the media file; and identifying a prefetching model from the usage model to reduce a seeking delay in accessing one or more next segments by prefetching one or more expected next segments identified from the usage model, wherein identifying the prefetching model includes:

representing the usage model as a probability function of a user seeking a particular segment, wherein the probability function is a function including representations of:

access occurrences for each segment, seeking occurrences for each segment, and both the access occurrences and the seeking occurrences for each segment, wherein the probability function p(x) includes:

$$p(x) = C \times P_p(X) \times P_s(x)$$

where:

x represents each of the segments of the media file,

C represents a normalization factor, $P_p(x)$ represents the access occurrences for each segment x, and $P_s(x)$ represents the seeking occurrences for each segment x, and deriving the prefetching model from the usage model to minimize a seeking distance; and prefetching the segments in accordance with the prefetching model.

2. The method of claim 1, wherein the empirical usage model includes:

a plurality of access occurrences representing a number of instances the segments were accessed by the users; and a plurality of seeking occurrences, representing a number of instances the segments were a seek destination for the users.

3. The method of claim 1, wherein the seeking distance is defined as a distance between a desired seeking destination and a resulting position of a next desired segment derived from the usage model, and a seeking distance $D_g$ includes:

$$D_g = E\{d(x, g(x))|x \in L\} = \int_{x \in L} d(x, g(x))p(x)dx$$

where:

E represents an expectation of the seeking distance;

g(x) is the prefetching model;

d(x, g(x)) is the seeking distance as a function of the segment x and the prefetching model g(x); and L is a number of segments to be prefetched.

4. The method of claim 3, wherein the prefetching model g(x) includes an optimal scheduling model, $\overline{g(x)}$, wherein $\overline{g(x)}$ includes:

$$\overline{g(x)} = \arg\min_g \{E\{d(x, g(x)) | x \in L\}.$$

5. The method of claim 4, wherein the optimal scheduling model is derived at least in part by:

representing the prefetching model as a scalar quantization function; and applying scalar quantization to solve the scalar quantization function.

6. The method of claim 5, wherein the scalar quantization function is solved using a Lloyd algorithm.

7. The method of claim 1, wherein the scheduling model directs prefetching of segments from at least one peer in a peer-to-peer network for a subsequent user accessing the media file.

8. A computer-implemented method, comprising:

dividing an audiovisual file into a plurality of segments;

accessing a usage model including:

an empirical usage model based on data representing a manner in which a plurality of users accessed an audiovisual file, wherein the empirical usage model represents at least one of:

access occurrences representing a number of instances of each of the segments accessed by the users;

seeking occurrences, representing a number of instances of each of the segments that was a seek destination for the users; or both, the access occurrences and the seeking occurrences; and an initial usage model representing a predicted manner in which users are expected to access segments of the audiovisual file, the initial usage model augmented by the data representing the manner in which the plurality of users accessed the audiovisual file;

determining from the usage model a probability of a user seeking one or more segments while accessing the audiovisual file;

applying scalar quantization to derive a prefetching model from the probability to minimize a seeking distance to an anticipated next desired segment, wherein deriving the prefetching model includes representing the usage model as a probability function of a user seeking a particular segment, wherein the probability function p(x) includes:

$$p(x) = C \times P_p(x) \times P_s(x)$$

where:

x represents each of the segments of the audiovisual file,

C represents a normalization factor, $P_p(x)$ represents the access occurrences for each segment x, and $P_s(x)$ represents the seeking occurrences for each segment x; and prefetching the segments in accordance with the prefetching model.

9. The method of claim 8, wherein the scalar quantization is solved using a Lloyd algorithm.

10. A computer-implemented method, comprising:

identifying a quantity of segments of a media file to be prefetched;

identifying a current region of a media file being accessed;

using a prefetching model, determining at least one next segment identified by a scheduling model as an expected next seeking destination from the current region, wherein using the prefetching model includes representing the usage model as a probability function of a user seeking a particular segment, wherein the probability function p(x) includes:

$$p(x)=C \times P_p(x) \times P_s(x)$$

where:
x represents each of the segments of the media file,
C represents a normalization factor,
$P_p(x)$ represents the access occurrences for each segment x, and
$P_s(x)$ represents the seeking occurrences for each segment x; and
prefetching the next segment in accordance with the prefetching model.

11. The method of claim 10, wherein the prefetching model used for each region of the media file is determined for each region of the media file.

12. The method of claim 10, wherein the quantity of segments to be prefetched is determined by at least one of:
available storage for caching prefetched segments;
available bandwidth by which the prefetched segments are retrieved; and
user preferences.

13. The method of claim 10, further comprising prefetching each of a quantity of next segments indicated as next segments identified by the prefetching model as expected next seeking destinations until the quantity of next segments reaches the quantity of segments to be prefetched.

14. The method of claim 13, wherein the prefetching model includes a hierarchical model, wherein:
the media file includes a plurality of regions, with at least a portion of the plurality of regions including a hierarchy of subregions, and at least one of the subregions includes a plurality of subregion segments; and
when seeking to a subregion results in the prefetching model wherein the plurality of next segments, combined with a plurality previously fetched segments, exceeds the quantity of segments, prefetching at least one segment from a subregion higher in the hierarchy of subregions is released to provide storage for prefetching at least one of the plurality of next segments.

15. The method of claim 14, wherein the hierarchial model includes a plurality of levels, and wherein a number of levels included in the hierarchial model is determined based on available storage for caching prefetched segments.

\* \* \* \* \*